July 26, 1966 F. SCHLOSS 3,263,210

WIDE BAND HYDROPHONE

Filed June 24, 1964

INVENTOR.
FRED SCHLOSS
BY [signature]
[signature]
ATTYS.

3,263,210
Patented July 26, 1966

3,263,210

WIDE BAND HYDROPHONE

Fred Schloss, Arlington, Va., assignor to the United States of America as represented by the Secretary of the Navy Filed June 24, 1964, Ser. No. 377,779
8 Claims. (Cl. 340—10)

The invention described herein may be manufactured and used by or for the Government of the United States of America for governmental purposes without the payment of any royalties thereon and therefor.

The present invention relates to hydrophones and more particularly to hydrophones utilizing a pair of sensing transducers.

In the field of underwater acoustics (signaling or detecting mechanical and acoustical vibrations), transducers, including those comprising hollow cylinders with electromechanical transducing properties, have been widely used.

Generally, the prior art hydrophones operate satisfactorily. However, there is a continuous need for making hydrophones more sensitive while maintaining their ruggedness.

The present invention provides a transducer retaining the ruggedness and compactness found in the prior art transducers and having increased sensitivity. This increase in sensitivity is accomplished by utilizing the space enclosed by a cylindrical piezoelectric crystal for mounting a second piezoelectric crystal within the first cylindrical piezoelectric crystal so that both crystals are exposed to the same acoustic pressure. The output of the inner cylindrical piezoelectric crystal and outer piezoelectric cylindrical crystal are coupled to a utilization network.

An object of the invention is to provide a hydrophone which utilizes the internal space in a first cylindrical crystal for housing a second crystal.

Another object of the invention is to provide a sensitive hydrophone.

A further object of the invention is to provide a hydrophone which is omnidirectional over a wide band of frequencies including both low and high frequencies.

Still another object of the invention is to provide a hydrophone utilizing a plurality of crystals for detecting the same acoustical pressure.

Yet another object of the invention is to provide a hydrophone which has a high electrical capacitive impedance (low capacity).

Figure 1:
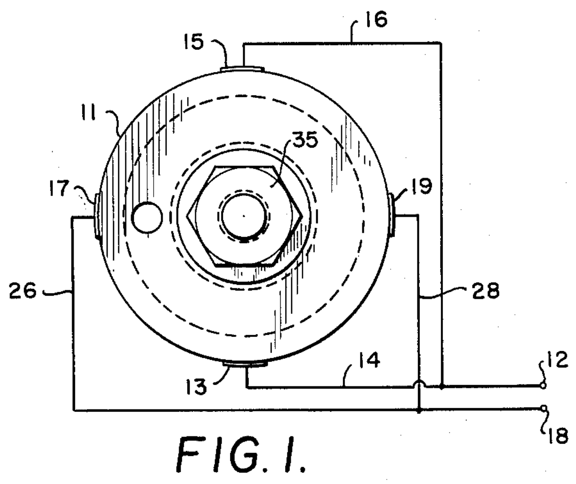
Figure 2:
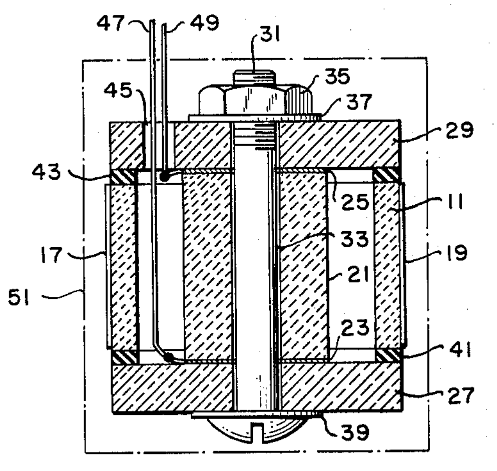

Other objects and many of the attendant advantages of this invention will be readily appreciated as the same becomes better understood by reference to the following detailed description when considered in connection with the accompanying drawings wherein:

FIG. 1 is a top plan view of a hydrophone incorporating features of the invention; and FIG. 2 is a sectional view of a hydrophone incorporating features of the invention.

Referring to FIGS. 1 and 2 there is shown an outer tangentially polarized cylindrical piezoelectric crystal 11 having a pair of positive electrodes 13 and 15 mounted on opposite sides of the cylinder. A pair of negative electrodes 17 and 19 are mounted on opposite sides of the cylinder and are respectively displaced 90° from electrodes 13 and 15. Electrodes 13 and 15 are connected to a common output point 12 by leads 14 and 16. Similarly electrodes 17 and 19 are connected to a common output point 18 by leads 26 and 28.

An inner piezoelectric cylinder 21 is mounted concentrically within said outer piezoelectric cylinder 11. The inner piezoelectric cylinder has a negative electrode 23 at one end of the cylinder and a positive electrode 25 at the other end of the cylinder. The electrical capacitance and sensitivities of the tangentially polarized cylindrical piezoelectric crystal 11 and the piezoelectric crystal 21 are approximately equal. However, if it is desirable to accentuate the response of the hydrophone in a given plane there the crystals may have different characteristics. A first glass end cap 27 is mounted next to electrode 23 and in a bearing relationship thereto. A second glass end cap is mounted next to electrode 25 and in a bearing relationship thereto. A bolt 31 containing an outer insulating coating 33 and a nut 35 holds the glass end caps 27 and 29 in position. Washers 37 and 39 are placed next to the glass end caps 27 and 29. A first pressure isolating mount 41 is mounted between the bottom of the tangentially polarized cylindrical piezoelectric crystal 11 and glass end cap 27. A second pressure isolating ring 43 is mounted between the top of the tangentially polarized cylindrical piezoelectric crystal 11 and glass end cap 29. The pressure isolating rings 41 and 43 can be made of suitable rubber. The glass end cap 29 contains a hole 45 for leads 47 and 49 which make contact with the electrodes 23 and 25 respectively. The completed unit is encapsulated in plastic or rubber coating 51 for keeping the unit watertight. Polyurethane is a suitable potting material for encapsulating the hydrophone. The aforedescribed unit may have both piezoelectric cylinders 11 and 12 connected in series by connecting lead 47 to terminal 12. The output of the hydrophone is taken from terminal 18 and lead 59 when the unit is connected in series. The series connected unit is very sensitive and has a minimum electrical capacitance. If the unit is to be connected in parallel then lead 47 is connected to terminal 18 and lead 49 is connected to terminal 12. It has been determined experimentally that a completed hydrophone was omnidirectional for all source of acoustic radiation spaced more than three inches distant from the outer surface of the hydrophone. Specifically, the hydrophone is equally sensitive to sonic vibrations that are perpendicular to the end plates as it is to sonic vibrations that are perpendicular to the surface of the cylindrical piezoelectric crystal 11.

The operation of the hydrophone illustrated in FIGS. 1 and 2 is that a source of acoustical energy (not illustrated) radiates energy which impinges on the outer surface of the tangentially polarized piezoelectric cylindrical crystal 11 thru the polyurethane coating 51. The cylindrical crystal 11 operates in the compressional mode generating a signal proportioal to the intensity of the acoustical wave. The inner piezoelectric cylindrical crystal 21 also operates in the compressional mode to generate a signal proportional to the intensity of the acoustical wave striking the glass end caps 27 and 29 through the polyurethane coating 51. The glass end caps are mechanically isolated from tangentially polarized piezoelectric cylindrical crystal 11 by rubber rings 41 and 43. When the cylindrical piezoelectric crystal 21 is connected in series with the tangentially polarized cylindrical piezoelectric crystal 11 then their output voltages add. If a source of alternating current signals are provided to the series connected cylindrical piezoelectric crystals 11 and 21 they form an omnidirectional radiator of acoustic waves.

By way of example and not for purposes of limitation the dimensions of a hydrophone built in the laboratory embodying the present invention are listed below:

Glass end cap 27—1/8" x 3/4" diameter.
Glass end cap 29—1/8" x 3/4" diameter 1/8" hole.
Rubber rings 41 and 43—.032 outside diameter 3/4"; inside diameter 5/8".
Screw—4-40 RH brass.
Washers—.050"-3/8" diameter 1/8" hole.
Silver electrodes 23 and 25—.005"-3/8" diameter; 1/8" hole.
Piezoelectric crystal 11—.500" x 5/8" inside diameter by 3/4" outside diameter capacitance 146$\mu\mu f$.
* Piezoelectric crystal 21—.500" x 1/8" inside diameter by 3/8" outside diameter capacitance 144$\mu\mu f$.

*.050-3/8" outside diameter 1/8" inside diameter spacer was placed on piezoelectric crystal 21 to provide proper spacing. However the piezoelectric crystal could be made .050 inch longer eliminating the need for a spacer.

Obviously many modifications and variations of the present invention are possible in the light of the above teachings. It is therefore to be understood that within the scope of the appended claims the invention may be practiced otherwise than as specifically described.

What is claimed is:

1. An omnidirectional hydrophone comprising:
a first cylindrical piezoelectric crystal; and
a tangentially polarized cylindrical piezoelectric crystal, said first cylindrical piezoelectric crystal being concentrically mounted within said tangentially polarized cylindrical piezoelectric crystal.

2. An omnidirectional hydrophone as defined in claim 1, further characterized by having a first and second end cap, said first end cap being mounted adjacent one end of said first cylindrical piezoelectric crystal and said second end cap being mounted adjacent the other end of said first cylindrical piezoelectric crystal.

3. An omnidirectional hydrophone as defined in claim 2 but further characterized by having a bolt holding said end caps in bearing relationship to said first cylindrical piezoelectric crystal.

4. An omnidirectional hydrophone comprising:
a first cylindrical piezoelectric crystal, a first electrode mounted on one end of said crystal;
a second electrode mounted on the other end of said crystal; and
a tangentially polarized cylindrical piezoelectric crystal, said first cylindrical piezoelectric crystal being concentrically mounted within said tangentially polarized cylindrical piezoelectric crystal;
a first end cap mounted adjacent to said first electrode of said first cylindrical piezoelectric crystal;

a first isolation means mounted between said first end cap and one end of tangentially polarized cylindrical piezoelectric crystal;
a second end cap mounted adjacent to said second electrode of said first cylindrical piezoelectric crystal;
a second isolation means mounted between said second end cap and the other end of said tangentially polarized cylindrical piezoelectric crystal;
a bolt mounted thru said first cylindrical piezoelectric crystal and said first and second end caps for holding said first and second end caps fixedly connected to said cylindrical piezoelectric crystal; and
a plastic potting material covering said omnidirectional hydrophone; whereby said tangentially polarized cylindrical piezoelectric crystal detects sonic vibrations received from a direction perpendicular to its surface and said first cylindrical piezoelectric crystal detects sonic vibrations from a direction perpendicular to said end caps.

5. An omnidirectional hydrophone as defined in claim 4 but further characterized by having said first and second isolation means comprising rubber rings.

6. An omnidirectional hydrophone as defined in claim 5 but further characterized by having said cylindrical piezoelectric crystal being electrically connected in series with said tangentially polarized cylindrical piezoelectric crystal.

7. An omnidirectional hydrophone as defined in claim 4 but further characterized by having said cylindrical piezoelectric crystal being electrically connected in series with said tangentially polarized cylindrical piezoelectric crystal.

8. An omnidirectional hydrophone as defined in claim 4 but further characterized by having said first cylindrical piezoelectric crystal and said tangentially polarized cylindrical piezoelectric crystal having approximately equal electric capacitance and having approximately equal sensitivities.

References Cited by the Examiner

UNITED STATES PATENTS

| | | | |
|---|---|---|---|
| 2,422,707 | 6/1947 | Turner | 340—8 |
| 2,834,943 | 9/1958 | Grisdale et al. | 340—8 |
| 2,945,208 | 7/1960 | Samsel | 340—10 |
| 3,199,071 | 8/1965 | Massa | 340—10 |

OTHER REFERENCES

Bitter, F.: Currents, Fields, and Particles, New York, Wiley & Sons, Inc., 1957, pages 62–63 relied on.

CHESTER L. JUSTUS, *Primary Examiner.*

J. P. MORRIS, *Assistant Examiner.*